Jan. 1, 1929.

A. DELLA RICCIA 1,697,661

DIRECT ELECTRIC CURRENT REGULATING TRANSFORMER

Original Filed April 19, 1923

Inventor
Angelo Della Riccia
By Cushman Bryant Darby
Attys

Patented Jan. 1, 1929.

1,697,661

UNITED STATES PATENT OFFICE.

ANGELO DELLA RICCIA, OF BRUSSELS, BELGIUM.

DIRECT-ELECTRIC-CURRENT-REGULATING TRANSFORMER.

Original application filed April 19, 1923, Serial No. 633,184, and in France March 15, 1923. Divided and this application filed January 4, 1926. Serial No. 79,263.

The present invention is a division of my earlier application Serial No. 633,184 filed April 19, 1923.

In my earlier copending application for Patent Ser. No. 519,558 filed Dec. 2nd 1921, I described a direct current regulating transformer or pressure splitting device with symmetrically divided flux operating in connection with electrical apparatus divided into two equal groups in order to control their supply at variable pressure by utilizing direct current of a main line at a normally constant voltage. In said application, I particularly described said transformer as applied to the control of motors for traction, hoisting and other similar purposes; but said transformer can as well be utilized for many other purposes, for instance for the control of storage batteries on charge and discharge.

My present invention relates to the control for charging and discharging storage batteries by means of a direct current transformer or pressure splitting device according to my above mentioned main application.

Figure 1:
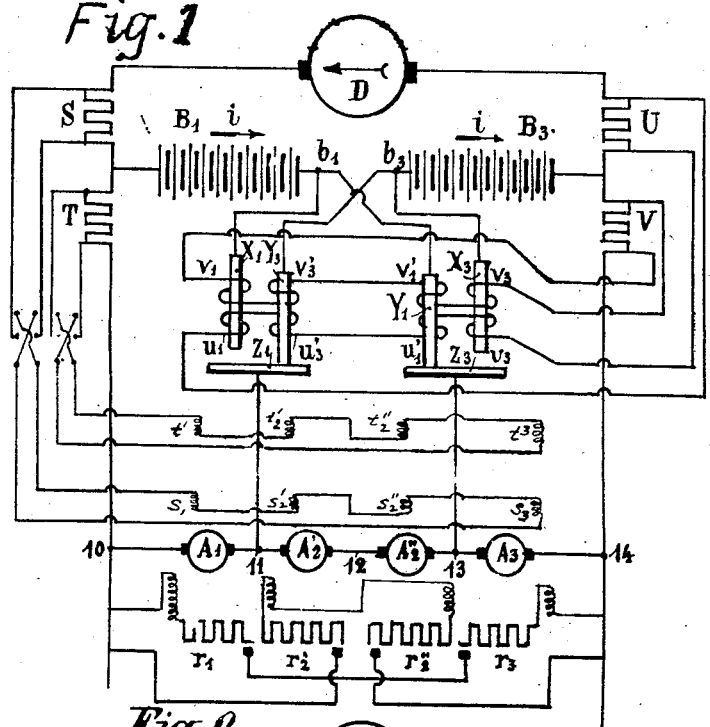
Figure 2:
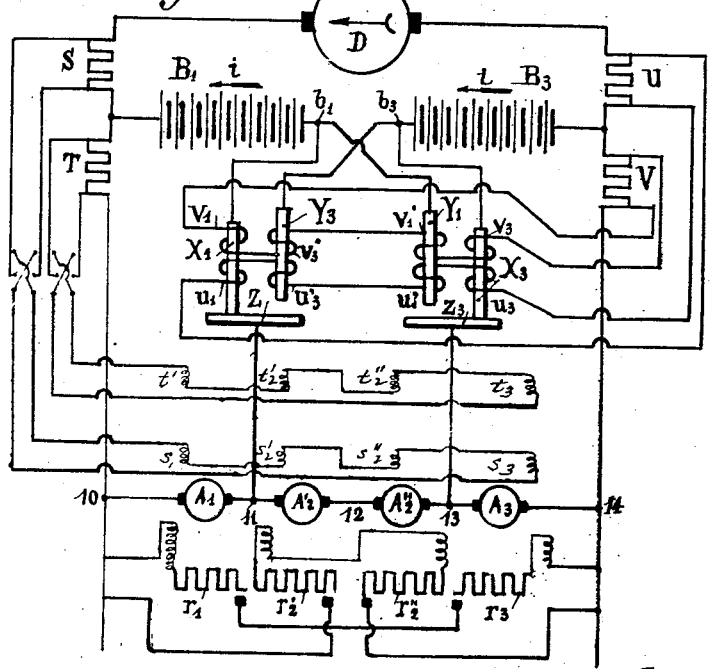

The annexed drawings represent one preferred embodiment of the invention in which Figs. 1 and 2 show two kinds of connections (crossed and straight connections) the first named or crossed connection being particularly adapted for charging, and the second, or straight connection for discharging in the case where charge or discharge is to be made without interruption; both said kinds of connections being equally adapted for charge and discharge when charging and discharging occurs alternately as in a buffer battery.

The transformer, of the motor generator type, comprises four armatures or armature parts, two end parts $A_1$ $A_3$, and two intermediate parts $A_2'$ $A_2''$ (which for convenience may be joined to form a single part, hereafter referred to as $A_2$), said parts being mounted on a common shaft and connected in series between the terminals of the main line.

The battery is divided in two equal groups $B_1$ and $B_3$ mounted in shunt with the supply line 10—14; each group is connected on one side invariably to the corresponding conductor of the line, and on the other side, by connections which sometimes are direct and sometimes crossed, to the intermediate points 11 and 13 of the shunt circuit 10 $A_1'$ 11 $A_2'$ 12 $A_2''$ 13 $A_3$ 14 so that at times, for instance for charging purposes, the battery group $B_1$ can be connected in shunt on the whole $A_1 + A_2' + A_2''$ of the armatures of the transformer and symmetrically the battery group $B_3$ on the whole $A_2' + A_2'' + A_3$ (crossed connections Fig. 1), or at other times for instance for charging purposes the battery group $B_1$ can be connected only on the extreme part $A_1$ and the battery group $B_2$ only on the part $A_3$ (direct connections Fig. 2).

The fluxes $\emptyset_1$ and $\emptyset_3$ which pass through the respective armature parts $A_1$ and $A_3$ are regulated so that $\emptyset_1 = \emptyset_3$; the fluxes $\emptyset_2'$ and $\emptyset_2''$, which pass through the respective armature parts $A_2'$ and $A_2''$, are regulated so that $\emptyset_2 = \emptyset_2''$. Assuming the pressure of the main line to be substantially constant, all the fluxes will be regulated so that the total flux $\emptyset_1 + \emptyset_2' + \emptyset_2'' + \emptyset_3$ will be constant.

The different fluxes in the various armature parts can be regulated during the operation so that each half of the battery shall be subjected to a gradually increasing pressure comprised between $\frac{1}{2}$ V and V (supposing V to be the main line voltage) during the charge, and to a gradually decreasing pressure comprised between $\frac{1}{2}$ V and O during the discharge, wherein the extreme voltage V and O are obviously not attained.

The arrangement may also be used for the charge and discharge of the battery as a buffer battery.

I may also, in the case of complete charging or discharging, as well as in that of charging or discharging as buffer battery, provide means whereby automatically to control the charge and discharge by using relays controlled by the difference between the whole or part current of the line and by means of which the fluxes are regulated so as to produce the required result. These means, which will be more fully described hereafter, while allowing the voltage to remain constant at the extreme ends of the whole formed by the battery taken together with the transformer, should generate in the armatures of the transformer the variations of E. M. F. which are necessary to produce the desired modifications of the voltages used on the two halves of the battery in order that those may be properly charged and discharged. For this purpose, one proceeds (Figs. 1 and 2) by adding to the exciting windings in shunt provided with field rheostats $r_1$ $r_2'$ $r_2''$ $r_3$, suitable compound windings $s$ $t$ whereof the first are supplied by the whole or a part (by means of a shunt S) of the current supplied by the generators D of the central station, and the second by the whole or a part (by a shunt T) of the current absorbed by the main line; the compound windings $s_1$ $s_3$ $t_1$ $t_3$ of the armatures $A_1$ $A_3$ are so disposed as to increase or reduce the electromotive forces of these armatures accordingly as the current in said compound windings increases or reduces whilst the windings $s_2'$ $s_2''$ $t_2'$ $t_2''$ of the intermediate armatures $A_2'$, $A_2''$ are so disposed as to act in the contrary direction upon the electro-motive forces of said armatures; the excitation in shunt $r$ (and compound $s$ and $t$) being predetermined so that the tensions at the ends of the armature parts $A_1$ $A_2'$ $A_2''$ $A_3$ shall be respectively $\frac{V}{2}$, 0, 0, $\frac{V}{2}$ when the currents at S and T are such that the battery remains inactive.

When the current required from the lines exceeds the normal capacity of the generators in the station, i. e. when the currents at S and T are such that the battery is to discharge (direct connections through the contacts $X_1$ $Z_1$, $X_3$ $Z_3$ Fig. 2, first example) the pressures at the ends of the armature parts $A_1$ $A_2'$ $A_2''$ $A_3$ should vary, according to the value of the current at T, between $\frac{V}{2}$, 0, 0, $\frac{V}{2}$ and $\frac{V}{2}-d$, $d$, $d$, $\frac{V}{2}-d$ respectively $\left(\frac{V}{2} - d\right.$ being the discharge voltage of one-half the battery used as a buffer): as the windings $s_1$ $s_3$, $s_2'$ $s_2''$ act in a nearly constant manner, the windings $t_1$ $t_3$, $t_2'$ $t_2''$ should therefore be predetermined in order to realize the above conditions.

When the normal current of the said generators exceed the current necessary for the line i. e. when the currents at S and T are such that the battery can be charged (crossed connections, and contacts $Y_1$ $Z_3$, $Y_3$ $Z_1$ Fig. 1 second example) the pressures at the ends of the armatures $A_1$ $A_2'$ $A_2''$ $A_3$ should vary, according to the current at S between $\frac{V}{2}$, 0, 0, $\frac{V}{2}$ and $\frac{V}{2}-c$, $c$, $c$, $\frac{V}{2}-c$ respectively $\left(\frac{V}{2}-c+c+c=\frac{V}{2}+c\right.$ being the charging voltage of one-half the battery used as a buffer); the various windings $s$ should thus be properly predetermined to correspond, whilst the various windings $t$ remain inactive. But for the complete charging which requires the pressures $\frac{V}{2}-f$, $f$, $f$, $\frac{V}{2}-f$ $\left(\frac{V}{2}-f+f+f=\frac{V}{2}+f\right.$ being the voltage for the complete charging of one-half the battery, $f$ having about double the value of $c$) one may employ the excitations in shunt $t$ in which case the windings $s$ serving only to allow the four pressures to be brought to the values $\frac{V}{2}-c$, $c$, $c$, $\frac{V}{2}-c$ relative to the charging as a buffer.

If it is desired to use the same arrangement for charging and discharging the battery sometimes with straight connections, sometimes with crossed connections it is sufficient to provide a reversing switch $j$ in the conductor passing from S to windings $s$ and a reversing switch $i$ in the conductor passing from T to the windings $t$.

The operation of the contacts $X_1$ $X_3$ $Y_1$ $Y_3$ for making the crossed connections for charge and the straight connections for discharge may at will and without any difficulties be made automatic.

For this purpose, and in the example set forth, the contact pieces $X_1$ $X_3$ $Y_1$ $Y_3$ consist of movable cores or are controlled by the movable cores of four differential solenoids $v_1$ $u_1 - v_3$ $u_3 - v_1'$ $u_1' - v_3'$ $u_3'$. The windings $u$ are supplied by the whole or a part (by the shunt U) of the current from the said generators D; the windings $v$ are supplied by the whole or a part (by the shunt V) of the current absorbed by the main line. When the current in V exceeds the current in U, the battery should discharge. The arrangement is such that the differential windings $u_1$ $v_1$ and $u_3$ $v_3$ shall thus maintain the contacts $X_1$ $Z_1$ and $X_3$ $Z_3$ which connect the intermediate terminals $b_1$ $b_3$ of the half-batteries respectively with the intermediate points 11 and 13 of the transforming machine; at the same time, the other differential windings $u_1'$, $v_1'$, $u_3'$ $v_3'$ will break the circuit at the other contacts, Fig. 2. On the contrary, if the current in V is less than the current in U, the battery can be charged: the arrangement is such that in this case the differential windings $u_1$ $v_1$, $u_3$ $v_3$ shall thus break the circuit at the corresponding contacts, whilst the windings $u_1'$ $v_1'$ and $u_3'$ $v_3'$ maintain the contacts $Y_1$ $Z_3$, $Y_3$ $Z_1$ connecting the intermediate terminals $b_1$ $b_3$ of the half-batteries, in a crossed manner, respectively with the intermediate points 13 and 11 of the transforming machine (Fig. 1). The same equipment may be used to operate the reversing switches between S and $s$ and between T and $t$ simultaneously with the contacts $X_1$ $Y_3$ $Z_1$ and $X_3$ $Y_1$ $Z_3$.

When a complete charging or discharging of the battery is not desired but only a use as a buffer battery between two voltages little distinct (higher and lower) of the unvarying current of the generator, the automatic contact pieces $X_1$ $X_3$ $Y_1$ $Y_2$ can be suppressed, because the straight connections and the crossed connections can each be used for charging and discharging.

In fact, the compound windings $s_1$ $s_2'$ $s_2''$ $s_3$ and $t_1$ $t_2'$ $t_2''$ $t_3$ permit the transition from charging to discharging (i. e. the applying of a voltage little lower or little higher than the unvarying voltage of the generator to the terminals of each group $B_1$ and $B_3$) by means of the variations that said windings produce in the voltages supplied by the armatures $A_1$ $A_2'$ $A_2''$ $A_3$ when the current absorbed by the supply passing through the windings $t$ tend to be lower than the current passing through the windings $s$ and vice versa.

Assuming $2Z$ to be the voltage of the generators and the mean voltage of the battery (i. e. $Z$ for each group) and $2z$ the quantity whose said voltage $2Z$ of the battery vary on more or on less ($z$ for each group), the voltages of the various elements of the device must, at transition from charging to discharging vary as follows:

1. In the case of straight connections (i. e. applying of the voltage of $A_1$ or $A_3$ to the terminals or group $B_1$ or $B_3$)

|  | $A_1$ or $A_3$ | $A_2'$ or $A_2''$ | $B_1$ or $B_3$ | $B_1+B_3$ |
|---|---|---|---|---|
| Charging | $Z+z$ | $-z$ | $Z+z$ | $2(Z+z)$ |
| State of equilibrium | $Z$ | $0$ | $Z$ | $2Z$ |
| Discharging | $Z+z$ | $+z$ | $Z-z$ | $2(Z-z)$ |

2. In the case of crossed connections (i. e. applying of the voltage of $A_1+A_2'+A_2''$ or $A_2'+A_2''+A_3$ to the terminals of group $B_1$ or $B_3$)

|  | $A_1$ or $A_3$ | $A_2'$ or $A_2''$ | $B_1$ or $B_3$ | $B_1+B_3$ |
|---|---|---|---|---|
| Charging | $Z-z$ | $+z$ | $Z+z$ | $2(Z+z)$ |
| State of equilibrium | $Z$ | $0$ | $Z$ | $2Z$ |
| Discharging | $Z-z$ | $-z$ | $Z-z$ | $2(Z-z)$ |

In the first case the transition from charging to discharging is realized by decrease of the voltage of $A_1$ or $A_3$, in the second case by increase of said voltage. It is therefore necessary that the windings $s$ and $t$ act in contrary sense according as one use continually straight or continually crossed windings. The reversing switches $j$ and $i$ permit, for this purpose, the reversing of the current sense on the circuits $s$ and $t$.

I claim—

1. In combination, a direct current regulating transformer comprising two end and two intermediate armature windings mounted on the same shaft and connected in series between the two terminals of the main distributing line, the two end armature windings and the intermediate windings being arranged in a symmetrical and equal manner with respect to the two terminals of the line, respective fields for all said windings, means to vary in a like manner the fluxes through the two end armature windings and in a like manner but in a contrary sense the fluxes through the intermediate windings, a storage battery divided into two equal parts the outer terminals of which are permanently connected to the two outer terminals of the transformer whilst the intermediate terminals are variably (with either direct or crossed connections) connected to the intermediate terminals of said transformer, the different fluxes in the various armature sections of said transformer being so regulated that each half of the battery shall be subjected to a gradually increasing tension which is comprised between $\frac{1}{2}V$ and $V$ during the charging, and to a gradually decreasing tension which is comprised between $\frac{1}{2}V$ and $O$ during the discharge.

2. In combination, a direct current regulating transformer comprising two end and two intermediate armature windings mounted on the same shaft and connected in series between the two terminals of the main distributing line, the two end armature windings and the intermediate windings being arranged in a symmetrical and equal manner with respect to the two terminals of the line, respective fields for all said windings, means to vary in a like manner the fluxes through the two end armature windings and in a like manner but in a contrary sense the fluxes through the intermediate windings, a storage battery divided into two equal parts the outer terminals of which are permanently connected to the two outer terminals of the transformer whilst the intermediate terminals are variably (with either direct or crossed connections) connected to the intermediate terminals of said transformer, the different fluxes in the various armature sections of said transformer being so regulated that each half of the battery shall be subjected to a gradually increasing tension which is comprised between $\frac{1}{2}V$ and $V$ during the charging, and to a gradually decreasing tension which is comprised between $\frac{1}{2}V$ and $O$ during the discharge, and, in addition to the excitation windings connected in shunt for the different armature sections of the transformer, compound windings, whereof a certain number are supplied by current furnished by the generators of the central station, and the others by current absorbed by the power line, the compound windings pertaining to the end armatures of the transformer being caused to act in the contrary sense to the windings pertaining to the intermediate armatures or armature sections of the said transformer.

3. In combination, a direct current regulating transformer comprising two end and two intermediate armature windings mounted on the same shaft and connected in series between the two terminals of the main distributing line, the two end armature windings and the intermediate windings being arranged in a symmetrical and equal manner with respect to the two terminals of the line, respective fields for all said windings, means to vary in a like manner the fluxes through the two end armature windings and in a like manner but in a contrary sense the fluxes through the intermediate windings, a storage battery divided into two equal parts the outer terminals of which are permanently connected to the two outer terminals of the transformer whilst the intermediate terminals are variably (with either direct or crossed connections) connected to the intermediate terminals of said transformer, the different fluxes in the various armature sections of said transformer being so regulated that each half of the battery shall be subjected to a gradually increasing tension which is comprised between $\frac{1}{2}$ V and V during the charging, and to a gradually decreasing tension which is comprised between $\frac{1}{2}$ V and O during the discharge, contact pieces provided for the crossed and straight connections, differential solenoids with movable cores disposed to control the movable cores of said contact pieces in such manner that the contacts will be made automatically by the differential action of the current supplied by the generator and of that absorbed by the power line.

ANGELO DELLA RICCIA.